United States Patent
Min et al.

(10) Patent No.: US 7,767,140 B2
(45) Date of Patent: Aug. 3, 2010

(54) METHOD FOR MANUFACTURING ZINC OXIDE NANOWIRES AND DEVICE HAVING THE SAME

(75) Inventors: Yo-sep Min, Yongin-si (KR); Eun-ju Bae, Yongin-si (KR); Wan-jun Park, Seoul (KR)

(73) Assignee: Samsung Electronics Co., Ltd. (KR)

( * ) Notice: Subject to any disclaimer, the term of this patent is extended or adjusted under 35 U.S.C. 154(b) by 1056 days.

(21) Appl. No.: 11/485,097

(22) Filed: Jul. 12, 2006

(65) Prior Publication Data

US 2007/0154385 A1  Jul. 5, 2007

(30) Foreign Application Priority Data

Jan. 2, 2006 (KR) .................. 10-2006-0000164

(51) Int. Cl.
 *C22C 18/00* (2006.01)
(52) U.S. Cl. .............. 420/513; 977/810; 977/811; 977/762; 117/68; 117/70; 117/921
(58) Field of Classification Search ............ 977/762, 977/810, 811; 420/513; 117/68, 70, 921
See application file for complete search history.

(56) References Cited

U.S. PATENT DOCUMENTS

2005/0009224 A1* 1/2005 Yang et al. .................. 438/57

FOREIGN PATENT DOCUMENTS

KR   1020050005122   1/2005

OTHER PUBLICATIONS

Zheng et al., "Fabrication of optical properites of large scale uniform zinc oxide nanowire arrays by one-step electrochemical deposition techinique," Chemical physics letters 363 (2002) p. 123-128.*
"Fabrication of ZnO Nanrods and Nanotubes in Aqueous Solutions"; Authors: Quanchang Li, et al.; Chem. Mater. vol. 17, pp. 1001-1006 (2005).

* cited by examiner

*Primary Examiner*—Robert M Kunemund
*Assistant Examiner*—Matthew J Song
(74) *Attorney, Agent, or Firm*—Cantor Colburn LLP (57) ABSTRACT

A method for manufacturing ZnO nanowires with a small diameter and increased length and a device comprising the same. The manufacturing method includes: forming a ZnO seed layer containing a hydroxyl group on a substrate; and growing ZnO nanowires on the ZnO seed layer containing the hydroxyl group. Preferably, the ZnO seed layer is a thin ZnO seed layer containing more than 50% of the hydroxyl group.

3 Claims, 11 Drawing Sheets

METHOD FOR MANUFACTURING ZINC OXIDE NANOWIRES AND DEVICE HAVING THE SAME

This application claims priority to Korean Patent Application No. 2006-0000164, filed on Jan. 2, 2006, and all the benefits accruing therefrom under 35 U.S.C. §119, the contents of which in its entirety are herein incorporated by reference.

BACKGROUND OF THE INVENTION

1. Field of the Invention

The present invention relates generally to a method for manufacturing zinc oxide ("ZnO") nanowires, and more particularly to a method for manufacturing zinc oxide nanowires using a ZnO seed layer containing a hydroxyl group and a device having the same.

2. Description of the Related Art

ZnO is a direct-transition-type oxide semiconductor material having a wide band gap energy of 3.37 eV in a hexagonal wurzite crystal structure, and has a large exciton bonding energy at room temperature. ZnO has high transmittance, a high index of refraction, and a large piezoelectric constant in the visible range of the electromagnetic spectrum. Because of these properties, ZnO is used in diverse ways including use in photonic crystals, optical modulator waveguides, varistors, transparent electrodes for use in solar cells, surface acoustic wave filters, light-emitting devices such as laser diodes, flat-panel displays, field emission displays ("FEDs"), photodetectors, gas sensors, UV shielding films, and including many other uses.

Although most previous uses of ZnO in electronic devices utilize a thin-film format, the use of ZnO nanorods and nanowires with a nano structure are becoming more widespread. ZnO nanowires yield their maximum efficiency by increasing the critical current density. A coating of ZnO nanowires can be used to increase the exposed area of, and therefore the photocatalytic efficiency of, a glass substrate.

Conventional methods for manufacturing ZnO nanowires include synthesis in solution, thermal chemical vapor deposition, metal organic chemical vapor deposition ("MOCVD"), molecular beam deposition, sol-gel deposition, sputtering processes, evaporation, spray pyrolysis, pulse laser deposition, and others.

The simplest process for manufacturing ZnO nanowires among those listed above is synthesis in solution, in which a substrate having a thin ZnO seed layer formed thereon is dipped in a mixed solution containing zinc nitrate $Zn(NO_3)_2 \cdot H_2O$ and hexamethylenetetramine ("HMTA"), and ZnO nanowires are grown therefrom at a temperature of about 95° C. (See Chem. Mater. 2005, VOL. 17, pp. 1001-1006)

Another common manufacturing technique is thermal chemical vapor deposition. For example, an alumina substrate is dipped in a solution containing catalytic metal particles, $Ni(NO_3)_2$ and ethanol, dried, and then put in a quartz boat filled with Zn powder inside a reactor. Later, the quartz boat is heated to about 450° C. while flowing about 500 sccm of Ar gas therein, and heat treatment is carried out at a temperature range of 450° C. to 950° C. for one hour to yield ZnO nanowires. (See Korean Patent Application Publication No. 2005-0005122).

However, the conventional techniques have limits to the precision of control they can exercise over the diameter of a ZnO nanowire during the manufacturing process. The conventional control technique of adjusting the surrounding atmosphere's conditions, e.g., vacuum condition, gas partial pressure, temperature and so on, has not been able to reduce the diameter of ZnO nanowires.

BRIEF SUMMARY OF THE INVENTION

Therefore, it is an aspect of the present invention to provide a method for manufacturing ZnO nanowires having a consistently smaller diameter than conventionally manufactured ZnO nanowire by using a ZnO seed layer containing a large quantity of hydroxyl groups.

Another aspect of the present invention includes a device having the ZnO nanowires manufactured by such a manufacturing method.

To achieve the above aspects and advantages, there is provided an exemplary embodiment of a method for manufacturing ZnO nanowires, the method including: forming a ZnO seed layer containing a hydroxyl group on a substrate; and growing ZnO nanowires on the ZnO seed layer containing the hydroxyl group.

In one exemplary embodiment of the formation of the ZnO seed layer, the ZnO seed layer is a thin ZnO seed layer containing more than about 50% of the hydroxyl group. Another exemplary embodiment includes a thin ZnO seed layer containing more than about 70% of the hydroxyl group.

In another exemplary embodiment of the formation of the ZnO seed layer, the ZnO seed layer containing the hydroxyl group is prepared by gasifying a Zn material and an oxidant material.

In another exemplary embodiment, the oxidant material is water ($H_2O$) or hydrogen peroxide ($H_2O_2$).

In another exemplary embodiment of the formation of the ZnO seed layer, the ZnO seed layer containing the hydroxyl group is prepared by forming a thin ZnO seed layer on the substrate and then performing a surface treatment by coating the surface of the thin ZnO seed layer with a hydroxyl group-containing substance.

In another exemplary embodiment the surface treatment involves causing a reaction between the thin ZnO seed layer and an aqueous solution of the hydroxyl group-containing substance and thereby, forming hydroxyl groups on the surface of the thin ZnO seed layer. Moreover, the surface treatment involves gasifying the hydroxyl group-containing substance and causing a reaction between a substrate having the thin ZnO seed layer formed thereon and the hydroxyl group-containing substance in gaseous phase so as to form the hydroxyl groups on the surface of the thin ZnO seed layer.

In another exemplary embodiment, the hydroxyl group-containing substance is selected from a group consisting of: water, hydrogen peroxide, alcohol, an aqueous solution of hydroxides, and a combination including at least one of the foregoing.

In another exemplary embodiment the growth of the ZnO nanowires is performed using one of chemical vapor deposition ("CVD"), sputtering or plasma enhanced chemical vapor deposition ("PECVD"), and atomic layer deposition ("ALD").

Another aspect of the present invention provides a device comprising ZnO nanowires, wherein the dimensions of the ZnO nanowires are substantially uniform.

In yet another exemplary embodiment, the ZnO nanowires have an average diameter of less than about 100 nm. In further exemplary embodiments, the ZnO nanowires formed on the ZnO seed layer have an average diameter of less than about 30 nm.

In yet another exemplary embodiment the ZnO nanowires have an average length of more than about one micron meter.

BRIEF DESCRIPTION OF THE DRAWINGS

The above aspects and features of the present invention will be more apparent by describing certain exemplary embodiments of the present invention with reference to the accompanying drawings, in which.

DETAILED DESCRIPTION OF THE INVENTION

The invention is described more fully hereinafter with reference to the accompanying drawings, in which exemplary embodiments of the invention are shown. The invention may, however, be embodied in many different forms and should not be construed as limited to the exemplary embodiments set forth herein. Rather these embodiments are provided so that this disclosure will be thorough and complete, and will fully convey the scope of the invention to those skilled in the art. In the drawings, the size and relative sizes of layers and regions may be exaggerated for clarity.

It will be understood that when an element or layer is referred to as being "on" or "connected to" another element or layer, the element or layer can be directly on or connected to another element or layer or intervening elements or layers. In contrast, when an element is referred to as being "directly on" or "directly connected to" another element or layer, there are no intervening elements or layers present. Like numbers refer to like elements throughout. As used herein, the term "and/or" includes any and all combinations of one or more of the associated listed items.

The terminology used herein is for the purposes of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing. Also, well-known functions or constructions are not described in detail since they would obscure the invention in unnecessary detail.

An exemplary embodiment of a method for manufacturing ZnO nanowires according to the present invention is characterized in that the size of a final ZnO nanowire can easily be controlled as desired by properly adjusting surface energy of the ZnO seed layer when the ZnO seed layer is formed on a substrate. An exemplary embodiment of the principle of the manufacturing method of the present invention can be explained with reference to FIGS. 1A and 1B as follows.

Figure 1A:
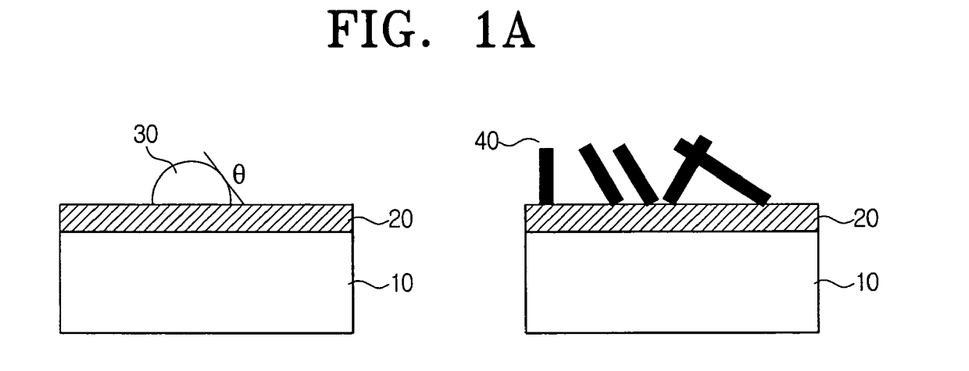
FIGS. 1A and 1B are schematic diagrams illustrating a mechanism for an exemplary embodiment of a manufacturing method of ZnO nanowires according to the present invention.
Figure 1B:
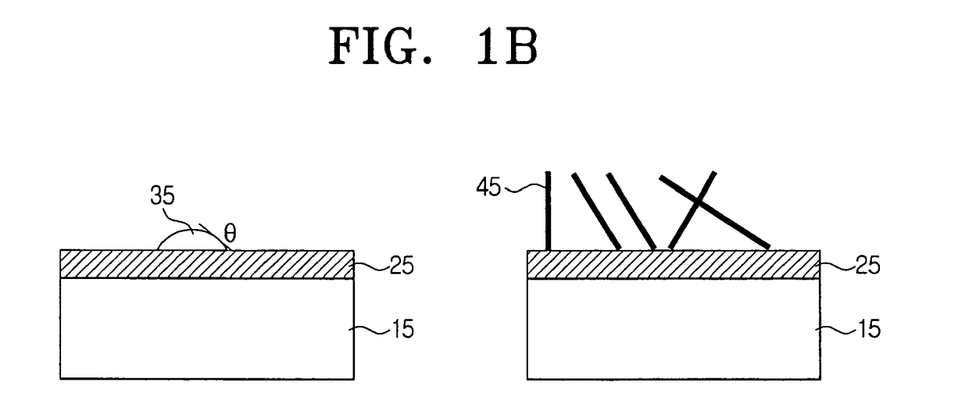

FIGS. 1A and 1B are schematic diagrams illustrating a mechanism for an exemplary embodiment of the manufacturing method of ZnO nanowires of the present invention. Referring to the drawings, thin ZnO seed layers 20 and 25 formed on substrates 10 and 15 function as seed layers for the growth of ZnO nanowires 40 and 45, respectively. As seen in block 100 of the drawings, if a water droplet 30 or 35 is dropped on the thin ZnO seed layers 20 and 25, the contact angles (θ and θ') between the water droplets 30 and 35 and the thin ZnO seed layers 20 and 25 differ. For instance, diffusivity of the water droplet 30 is smaller on the thin ZnO seed layer 20 in FIG. 1A, meaning that the surface energy thereof is greater than that of the thin ZnO seed layer 25 in FIG. 1B.

Figure 2A:
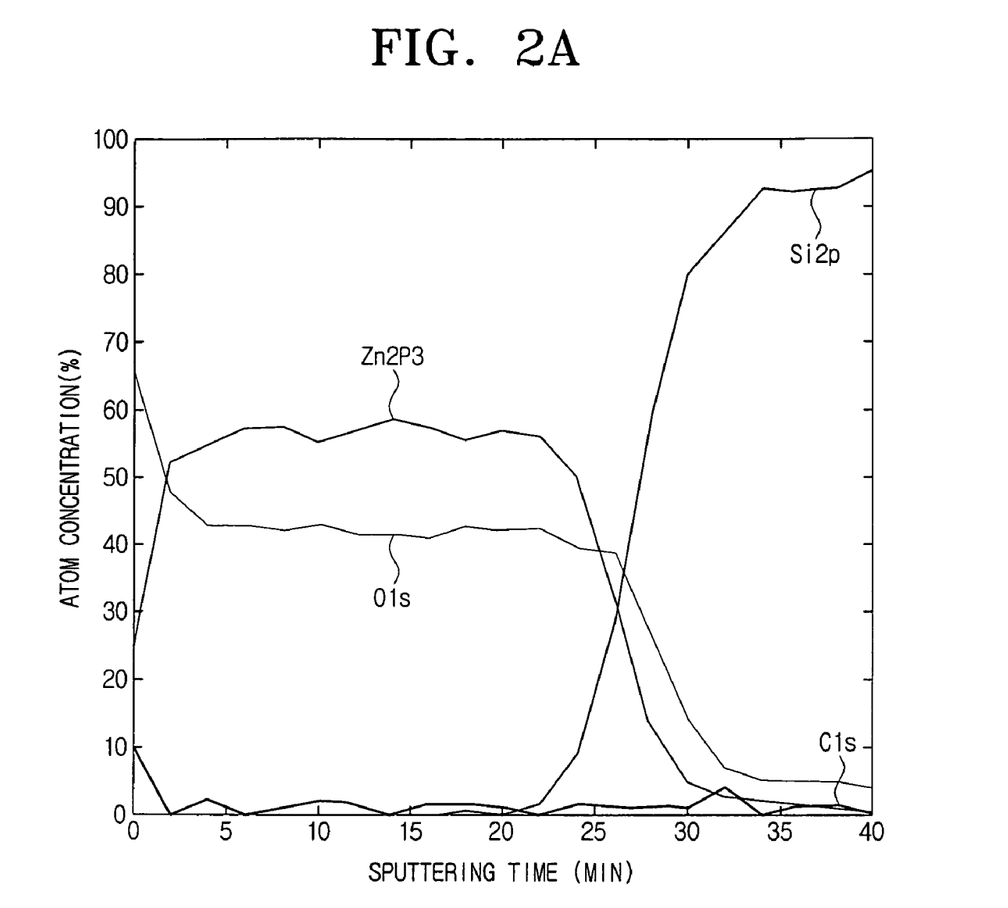
FIGS. 2A and 2B are graphs showing the atomic concentrations by depth in an exemplary embodiment of a thin ZnO seed layer according to the present invention and of a comparative example of the prior art, respectively.
Figure 2B:
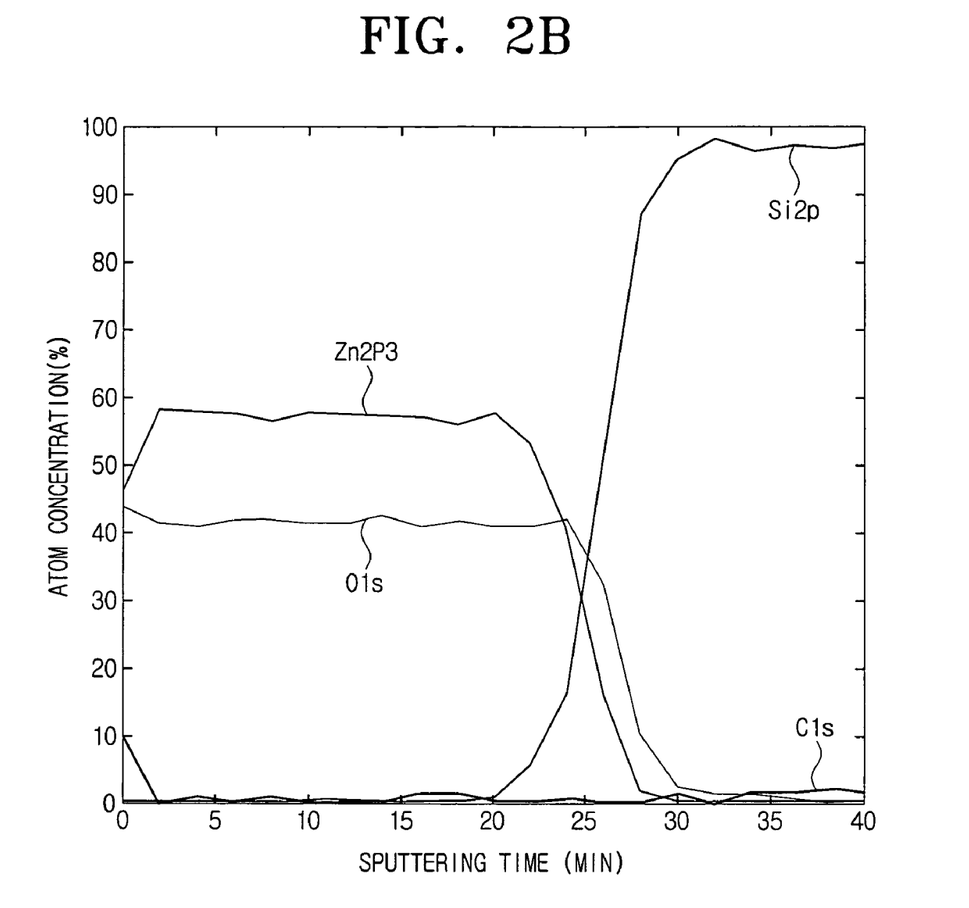

When ZnO nanowires 40 and 45 are grown in thin ZnO seed layers having different surface energies, as shown in block 200 of FIGS. 1B and 2B, a respective diameter and length of the resulting ZnO nanowires are different. By using a ZnO seed layer having a small surface energy, it is possible to reduce the diameter and increase the length of the final ZnO nanowire.

It is an aspect of the manufacturing method of the present invention to obtain ZnO nanowires having a relatively small diameter based on the above principle. According to an exemplary embodiment of the invention, the surface energy of the ZnO seed layer may be reduced by providing a large quantity of hydroxyl groups to the surface of the ZnO seed layer during the growing process of ZnO nanowires.

According to an exemplary embodiment of the manufacturing method of the present invention, a ZnO seed layer containing hydroxyl groups may be formed on a substrate, and ZnO nanowires are grown on this ZnO seed layer containing the hydroxyl groups.

Exemplary embodiments of the substrate include any kind of substrate containing Si, $SiO_2$ or glass.

During ZnO seed layer formation, exemplary embodiments of the ZnO seed layer include a hydroxyl-rich ZnO layer. One exemplary embodiment includes a thin ZnO seed layer containing more than about 50% of hydroxyl groups. Another exemplary embodiment includes a ZnO seed thin-layer containing more than about 70% of hydroxyl groups.

There are various means to add hydroxyl groups to the ZnO seed thin-layer during ZnO seed layer formation. For instance, in one exemplary embodiment a hydroxyl-rich ZnO seed layer may be formed by gasifying a Zn material and oxidant material. A further exemplary embodiment uses water or hydrogen peroxide as the oxidant material.

In yet another exemplary embodiment, hydroxyl groups may be added to the thin ZnO seed layer after formation of the thin ZnO seed layer on the substrate. For example, the thin ZnO seed layer may first be formed on the substrate and then the surface of the thin ZnO seed layer may be treated with a substance containing a hydroxyl group.

An exemplary embodiment of the surface treatment described above involves depositing the substance containing a hydroxyl group in gaseous phase onto the surface of the thin ZnO seed layer. Another exemplary embodiment involves letting the substrate having the thin ZnO seed layer formed thereon react in a liquid, especially an aqueous solution, which contains the hydroxyl group to yield hydroxyl groups. Exemplary embodiments of substances containing a hydroxyl group include water ($H_2O$), hydrogen peroxide ($H_2O_2$), alcohol (R—OH) and an aqueous solution of hydroxides. Exemplary embodiments of aqueous solutions of hydroxides include NaOH, KOH, and similar substances.

According to an exemplary embodiment of the present invention, growth of the ZnO nanowires can be done by one of chemical vapor deposition ("CVD"), sputtering, plasma enhanced chemical vapor deposition ("PECVD") and atomic layer deposition ("ALD").

The following will now describe an exemplary embodiment of an example for manufacturing ZnO nanowires, according to the present invention and a comparative example not including the use of a hydroxyl group.

EXAMPLE

Using diethylzinc ("DEZ") and water as a Zn material and oxidant, respectively, approximately 20 nm of thin ZnO seed layer was formed on a silicon substrate using the conventional ALD process.

The ALD process conditions were set as follows.

Temperature of the DEZ container was set to about 3° C., and the DEZ and water were supplied for about 0.5 second, respectively. Also, purge time of the DEZ was about 10 seconds, whereas purge time of water was about 15 seconds. The ALD was carried out at approximately 200° C. of deposition temperature. In addition, to grow nanowires on the thin ZnO seed layer in an aqueous solution, an aqueous solution containing 6 mM of $Zn(NO_3)_3 \cdot x \cdot H_2O$ (zinc nitrate hydrate) and 6 mM of hexamethylenetetramine ("HMTA") was prepared in a vial. The thin ZnO seed layer was turned upside down and floated on the surface of the aqueous solution. Then, the vial was closed to let the reaction continue for 15 hours at about 95° C. and nanowires were grown therefrom.

COMPARATIVE EXAMPLE

The same method as used in the example above was used to form a thin ZnO seed layer on a substrate, except that the deposition of the ALD was set to about 130° C. Moreover, nanowires were grown on the thin ZnO seed layer without the introduction of the aqueous solution.

RESULTS

First, a relation between atomic concentration and sputtering time was analyzed in the depth direction of the thin ZnO seed layers formed on the exemplary embodiment of the present invention example and comparative example, respectively, and the analysis results are shown in FIGS. 2A and 2B.

As shown in FIGS. 2A and 2B, the atomic concentration patterns in the depth direction of the thin ZnO seed layers of the exemplary embodiment of the present invention example and comparative example are relatively similar.

Figure 3A:
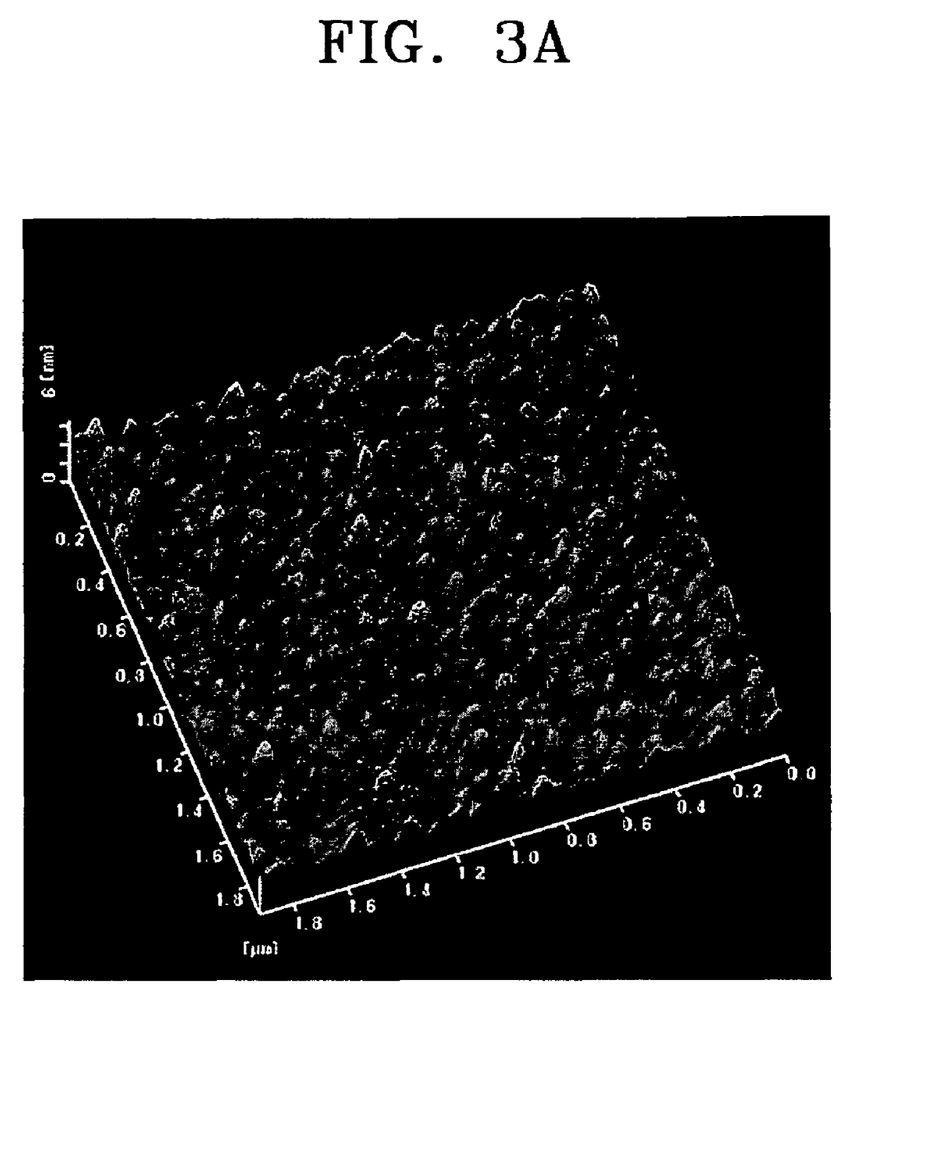
FIGS. 3A and 3B are atomic force microscope ("AFM") imaged surface pictures of an exemplary embodiment of a thin ZnO seed layer according to an exemplary embodiment of the present invention and of a comparative example of the prior art.
Figure 3B:
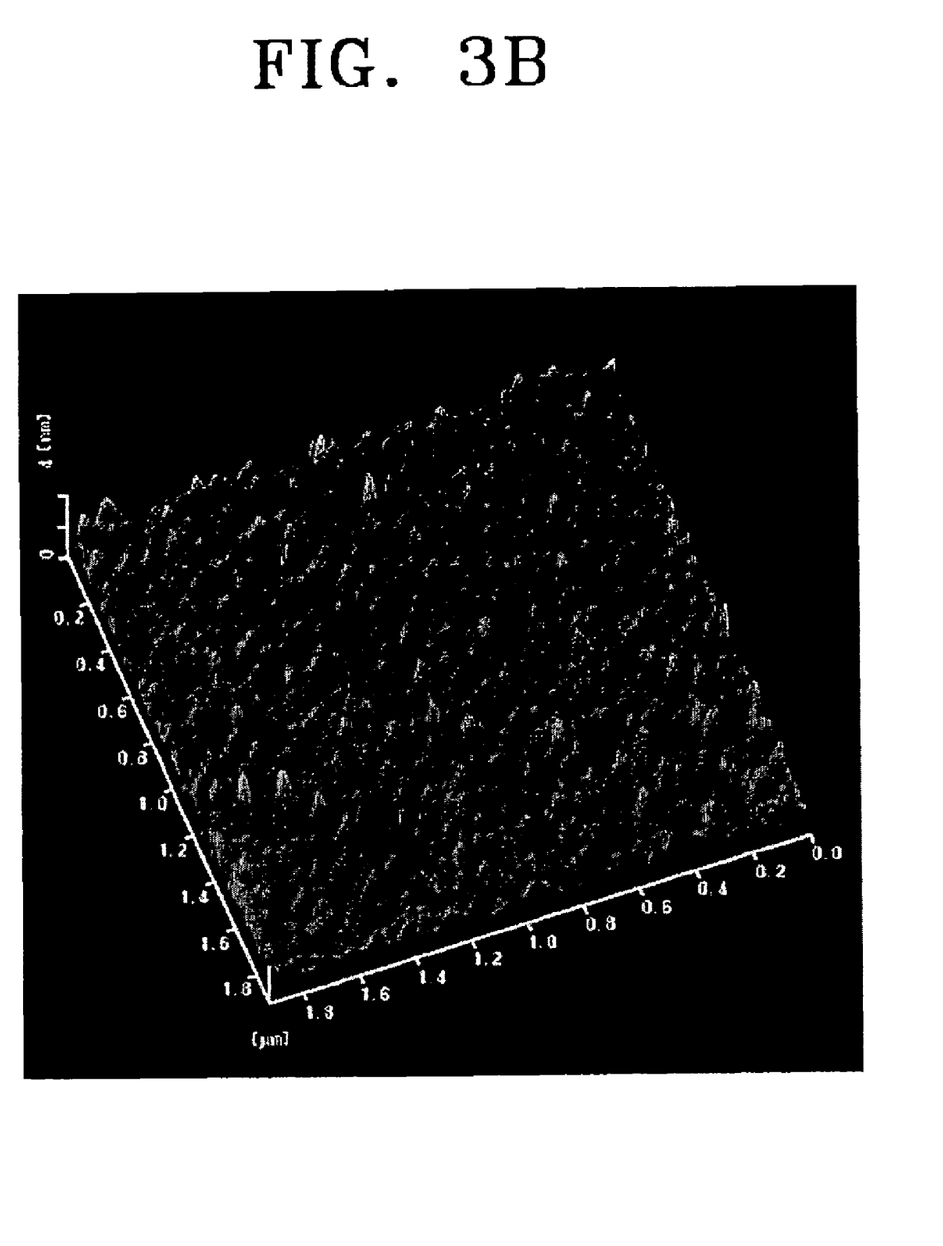

Each of the thin ZnO seed layers was observed through an atomic force microscope ("AFM"), and their results are illustrated in FIGS. 3A and 3B, respectively. As shown in FIGS. 3A and 3B, root mean squares ("RMS") of the amplitude of the thin ZnO seed layers of the exemplary embodiment of the present invention example and comparative example were 4.75 and 5.83, respectively, which are relatively similar.

Figure 4A:
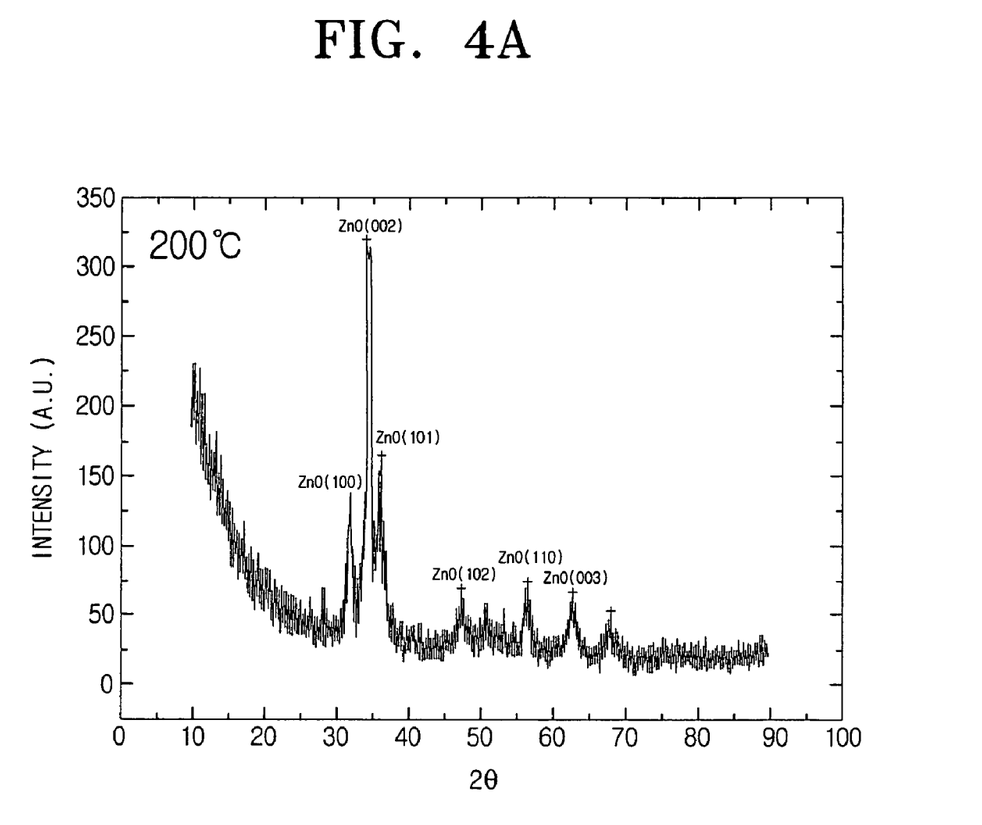
FIGS. 4A and 4B are graphs showing X-ray diffraction patterns for an exemplary embodiment of the thin ZnO seed layer according to the present invention and of a comparative example of the prior art, respectively.
Figure 4B:
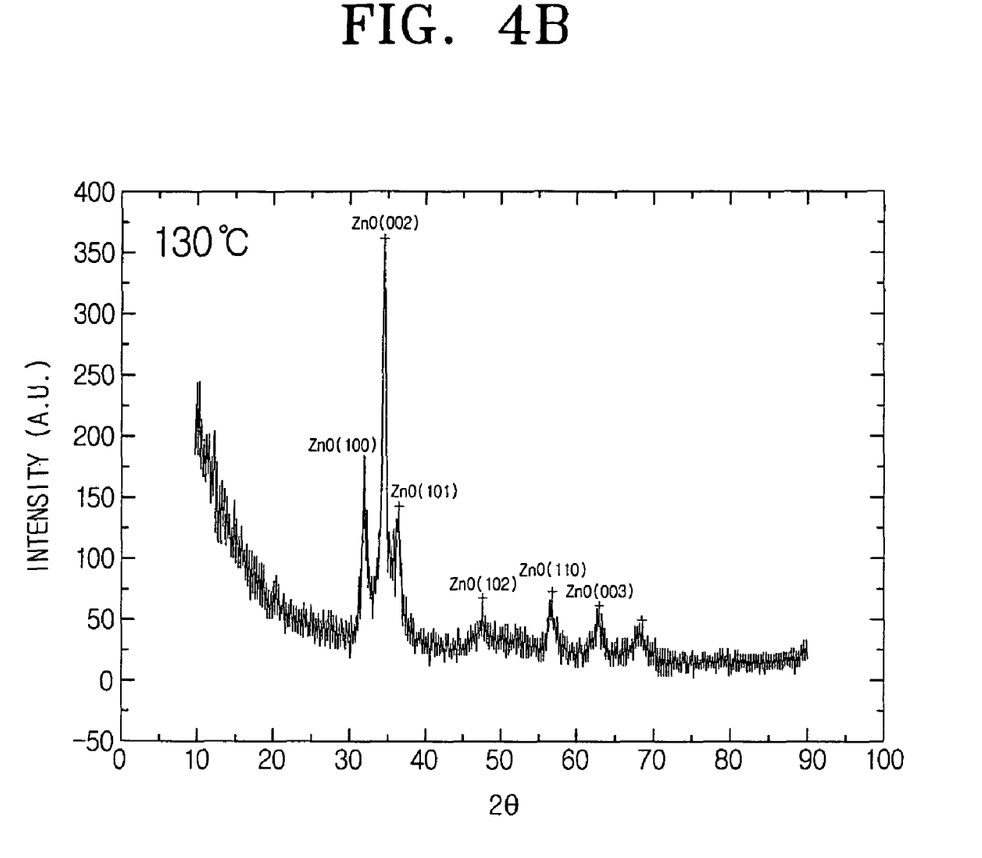

Moreover, X-ray diffraction ("XRD") analysis was performed on each thin ZnO seed layer and the results are shown in FIGS. 4A and 4B. As shown in the XRD analysis, the exemplary embodiment of the present invention example and the comparative example showed similar diffraction patterns. This means that there may be little difference between them due to their crystal structures.

After dropping a droplet of water onto the thin ZnO seed layers of the comparative example and the exemplary embodiment of the present invention example, contact angles ($\theta$ and $\theta'$) between the thin ZnO seed layers and the surface of water were measured, respectively. It turned out that the contact angles were 68.9±4.0° for the comparative example and 42.5±2.7° for the exemplary embodiment of the present invention example. That is, compared with the comparative example, the thin ZnO seed layer according to the exemplary embodiment of the present invention example had a lower surface energy against water.

Figure 5:
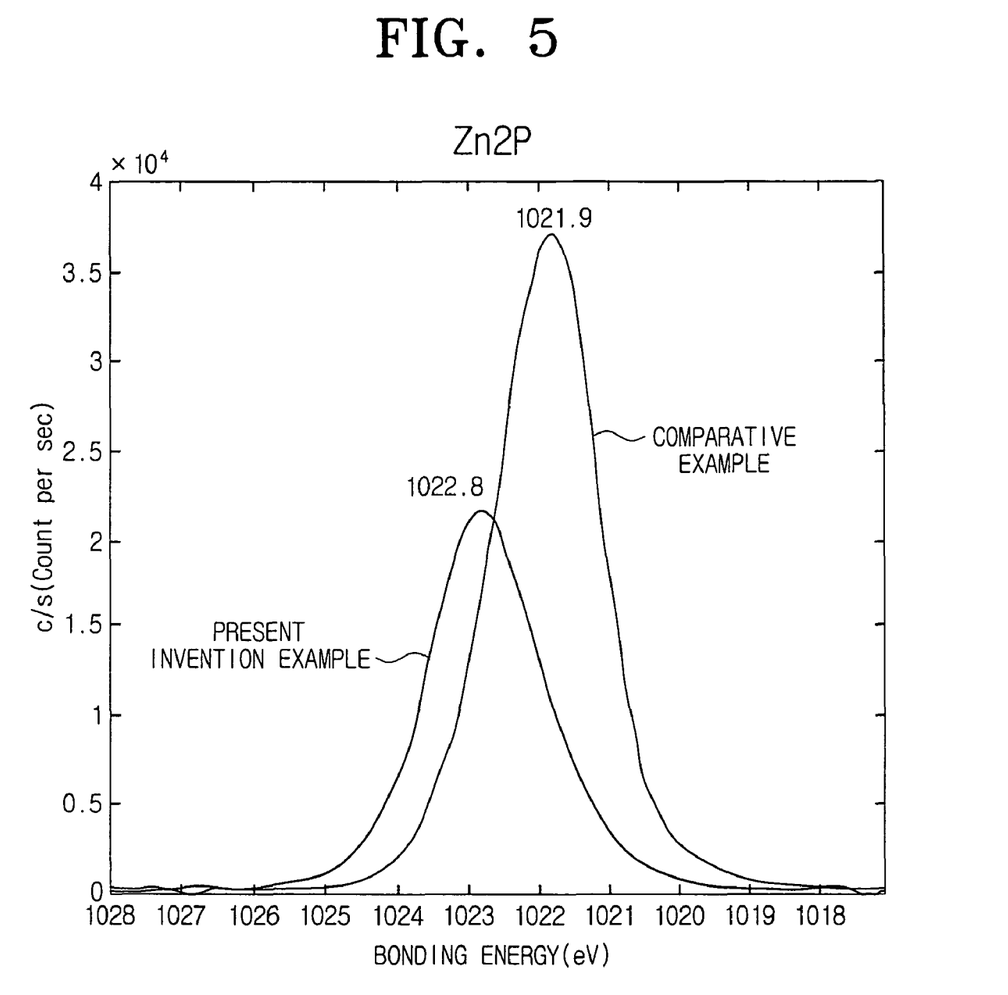
FIG. 5 is a graph showing the Zn2p bonding energies at thin ZnO seed layers of an exemplary embodiment of the present invention and of a comparative example of the prior art.
Figure 6:
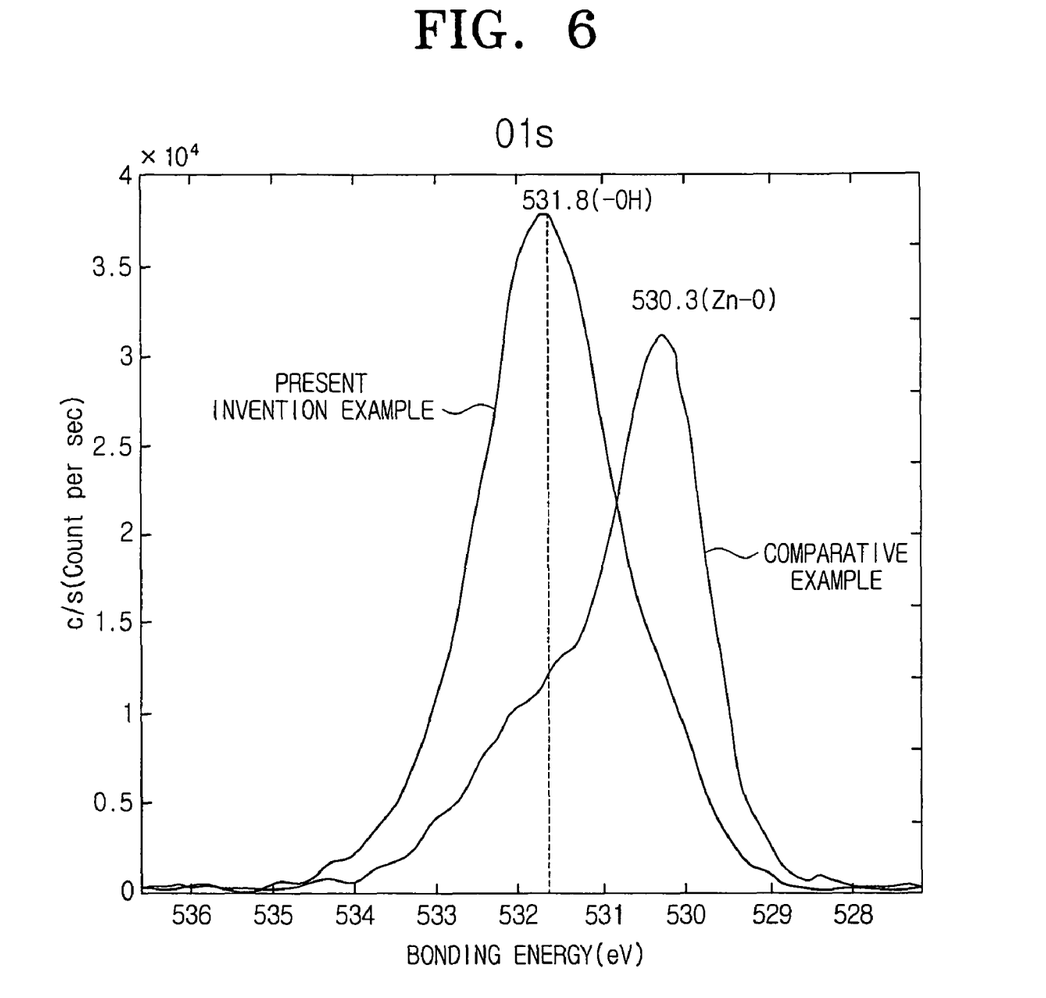
FIG. 6 is a graph showing O1s bonding energies at thin ZnO seed layers of an exemplary embodiment of the present invention and of a comparative example of the prior art.

Binding energy was measured in order to find out the degree of bonding between atoms in each thin ZnO seed layer. FIG. 5 is a graph showing Zn2p bonding energies at the thin ZnO seed layers according to the exemplary embodiment of the present invention example and the comparative example. FIG. 6 is a graph showing O1s bonding energies at the thin ZnO seed layers according to the exemplary embodiment of the present invention example and the comparative example.

As illustrated in FIGS. 5 and 6, a large quantity of hydroxyl groups existed on the surface of the ZnO of the exemplary embodiment of the present invention example, whereas a large quantity of oxygen (O) existed on the surface of ZnO of the comparative example.

Figure 7A:
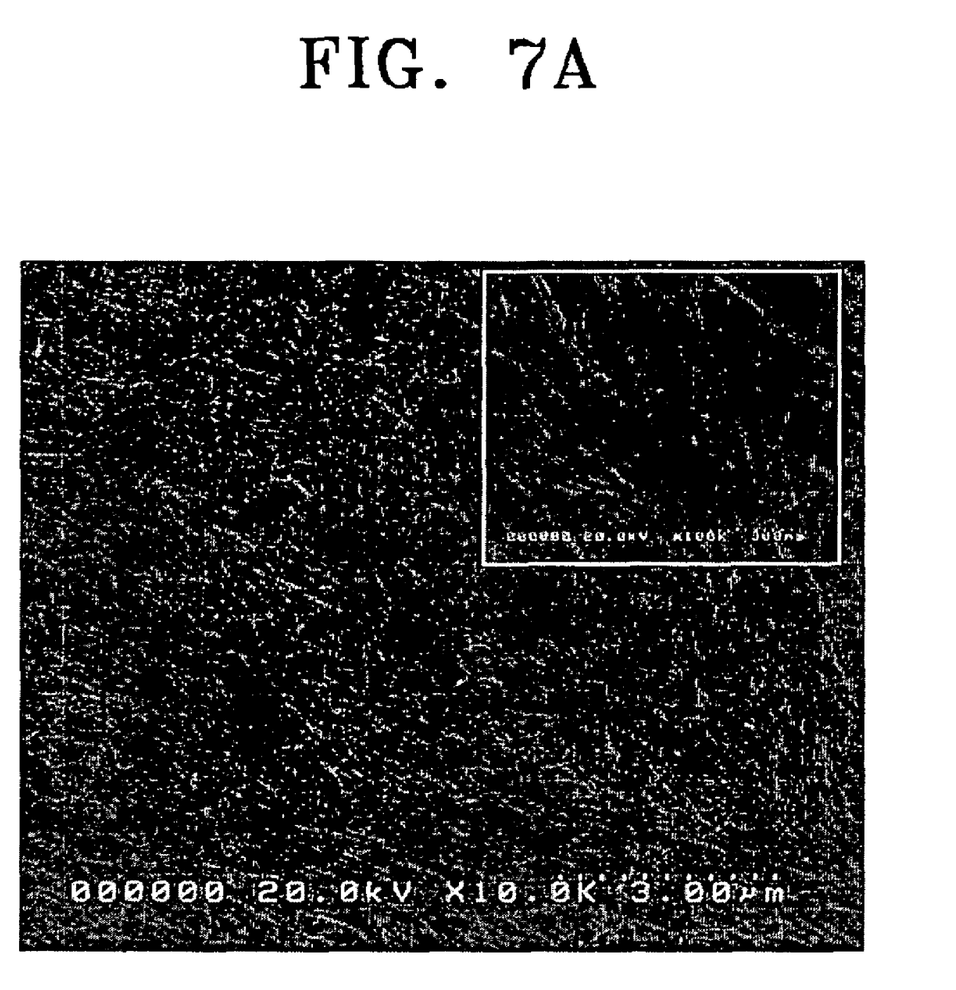
FIGS. 7A and 7B are scanning electron microscope ("SEM") pictures of an exemplary embodiment of ZnO nanowires which are grown according to the present invention and a comparative example of the prior art, respectively.
Figure 7B:
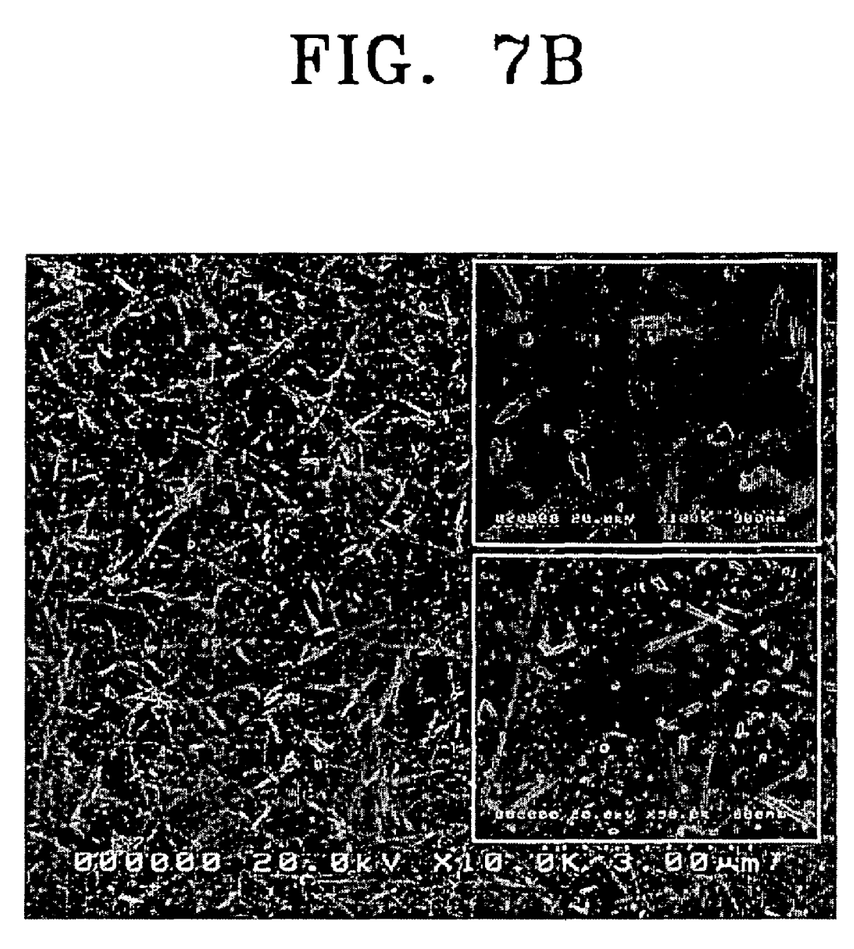

Results of scanning electron microscope ("SEM") observations of ZnO nanowires grown under the same conditions on the thin ZnO seed layers of the exemplary embodiment of the present invention example and comparative example are illustrated in FIGS. 7A and 7B.

As shown in FIGS. 7A and 7B, the diameter of nanowires according to an exemplary embodiment of the present invention example having a small surface energy, e.g., where a hydroxyl-rich thin ZnO seed layer was used as a seed layer, was less than about 30 nm and the length of such nanowires was as long as several micron meters. On the other hand, the diameter of many of the nanowires according to the comparative example had individual diameters as thick as about 100 nm although there were also nanowires smaller than 30 nm in diameter. Additionally, nanowires of the comparative example were relatively short and showed a low density.

As explained so far, according to the present invention, a high density of ZnO nanowires having small diameter and increased length can easily be obtained by using a ZnO seed layer with a small surface energy. By applying the manufacturing principle of the present invention, the ZnO seed layer can be properly patterned on the substrate by adjusting the content of hydroxyl groups in a way to make the surface energy of the ZnO seed layer smaller. It also becomes possible to grow ZnO nanowires only at a desired position on the substrate.

Although the exemplary embodiments of the present invention have been described, it will be understood by those skilled in the art that the present invention should not be limited to the described exemplary embodiments, but various changes and modifications can be made within the spirit and scope of the present invention as defined by the appended claims.

What is claimed is:

1. A device, comprising:
   a substrate;
   a seed layer containing hydroxyl groups formed on the substrate; and
   a plurality of ZnO nanowires grown on the seed layer;
   wherein dimensions of the ZnO nanowires are substantially uniform, and
   wherein the seed layer comprises a hydroxyl-rich ZnO seed layer containing more than about 50% of hydroxyl groups.

2. The device of claim 1, wherein the ZnO nanowires have an average diameter of less than about 100 nm.

3. The device of claim 1, wherein the ZnO nanowires have an average length of more than about one micrometer.

* * * * *